(12) United States Patent
Hoffjann et al.

(10) Patent No.: US 7,739,947 B2
(45) Date of Patent: Jun. 22, 2010

(54) APPARATUS FOR PREPARING MEALS

(75) Inventors: Claus Hoffjann, Hamburg (DE); Andreas Westenberger, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 820 days.

(21) Appl. No.: 11/560,458

(22) Filed: Nov. 16, 2006

(65) Prior Publication Data

US 2007/0110861 A1    May 17, 2007

(30) Foreign Application Priority Data

Nov. 17, 2005    (DE) ........................ 10 2005 054 884

(51) Int. Cl.
*A47J 39/02*    (2006.01)
*H01M 8/00*    (2006.01)
(52) U.S. Cl. ............................. 99/326; 99/330; 99/334; 99/467; 99/473; 99/483; 219/401
(58) Field of Classification Search ........... 99/325–333, 99/339–355, 483, 451, 484, 467–479, 485–491, 99/DIG. 14, 329 R, 334; 219/494–497, 521–525, 219/701, 728, 401
See application file for complete search history.

(56) References Cited

U.S. PATENT DOCUMENTS

| | | | | | |
|---|---|---|---|---|---|
| 3,353,476 | A | * | 11/1967 | Goodman et al. | ............. 99/328 |
| 3,665,491 | A | * | 5/1972 | Cooper | ........................ 219/701 |
| 3,725,645 | A | * | 4/1973 | Shevlin | ....................... 219/521 |
| 3,987,267 | A | * | 10/1976 | Moore | ........................ 219/728 |
| 7,172,702 | B2 | * | 2/2007 | Hoffjann et al. | ............. 210/652 |
| 2006/0185810 | A1 | | 8/2006 | Juergens et al. | |

FOREIGN PATENT DOCUMENTS

| | | |
|---|---|---|
| DE | 19626955 A1 | 1/1998 |
| DE | 19821952 C2 | 11/1999 |
| DE | 10309506 A1 | 9/2004 |
| DE | 10337161 | 3/2005 |
| DE | 10356012 A1 | 6/2005 |
| DE | 10360303 A1 | 7/2005 |

* cited by examiner

*Primary Examiner*—Reginald L Alexander
(74) *Attorney, Agent, or Firm*—Wood, Herron & Evans, LLP

(57) ABSTRACT

An apparatus (10) for preparing meals, which is suitable in particular for use on board a commercial aircraft, includes a meal preparation unit (12) and a supply unit (14). The supply unit (12) includes a fuel cell system (16) having a fuel cell (18) and is equipped to supply the meal preparation unit (12) with water produced by the fuel cell (18).

9 Claims, 1 Drawing Sheet

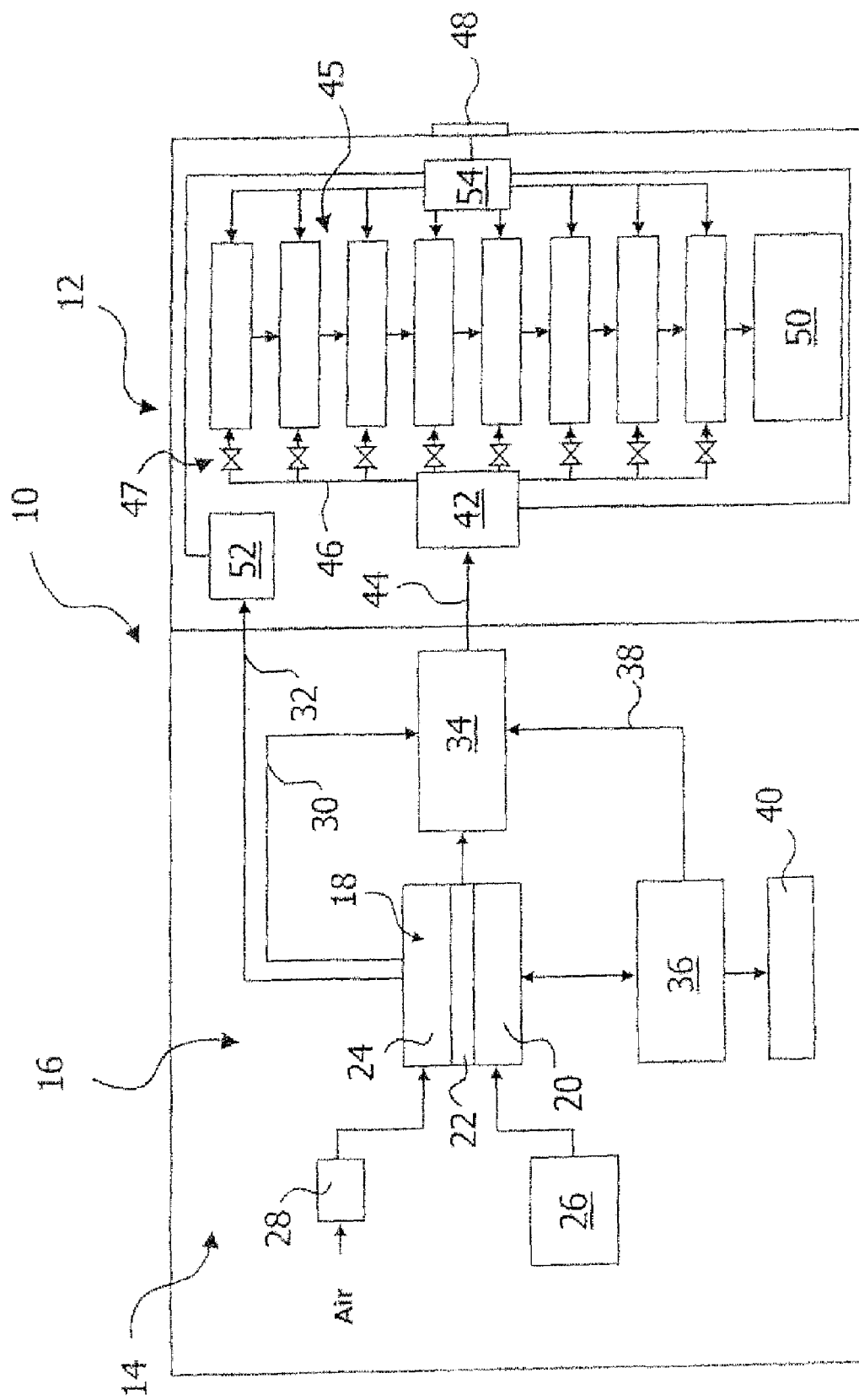
Figure

APPARATUS FOR PREPARING MEALS

TECHNICAL FIELD

The invention relates to an apparatus for preparing meals, and to a system of apparatuses for preparing meals which are suitable in particular for use on board a commercial aircraft.

BACKGROUND OF THE INVENTION

Currently it is conventional on board commercial aircraft to use a steam oven arranged in the galley of the aircraft for preparing hot meals for the passengers. In this case ready meals that are normally supplied by a catering service are put in the steam oven and are subjected therein to the action of hot steam. Consequently the ready meals are supplied with both the water and heat which are required to bring the set meals into a ready-to-serve state. The use of a conventional steam oven to prepare hot meals on board an aircraft has the drawback that a relatively large amount of water is required to operate the steam oven and this has to be stored in a tank in the heated region of the aircraft so it is prevented from freezing.

DE 196 26 955 A1 describes a convection oven provided for use in an aircraft galley and which comprises a water trough that can be heated and is connected to a water reservoir at the galley side.

From DE 103 09 506 A1 is known an apparatus for heating meals which is provided for use in an aircraft and comprises at least one induction coil for generating an electromagnetic alternating field.

DE 198 21 952 C2 discloses an energy supply unit on board an aircraft in which a main engine generator, an auxiliary power unit, a ram air turbine or a NiCd battery is replaced by a PEM fuel cell. Water obtained from the exhaust flow of the fuel cell can be used to supply the aircraft's own water system.

DE 103 56 012 A1 relates to an arrangement for generating water on board an aircraft which comprises a fuel cell supplied with air and water.

DE 103 60 303 A1 describes a heating system for use in a galley of an aircraft. The heating system comprises electrical heating elements and a control unit, wherein the control unit controls the supply of electrical energy to the heating elements from a d.c. power source or a fuel cell.

SUMMARY OF THE INVENTION

The object underlying the invention is to provide an apparatus for preparing meals and a system of apparatuses for preparing meals which are easy to operate, are energy efficient and are suitable in particular for use on board a commercial aircraft.

To achieve said object an apparatus according to the invention for preparing meals comprises a meal preparation unit and a supply unit. The meal preparation unit comprises a plurality of receiving devices for receiving the meals that are to be prepared in the meal preparation unit, a selecting mechanism for selecting a meal that is to be prepared and is received in the receiving device, and a supplying mechanism which is equipped to selectively supply water and/or steam to a meal that is to be prepared and has been selected by way of the selecting mechanism. The supply unit comprises a fuel cell system having a fuel cell, wherein the fuel cell is connected to the supplying mechanism of the meal preparation unit to supply the supplying mechanism with water and/or steam produced by the fuel cell.

The fuel cell used in the supply unit of the apparatus according to the invention for preparing meals comprises a cathode region and an anode region that is separated from the cathode region by an electrolyte. During operation of the fuel cell hydrogen is supplied to the anode side of the fuel cell and an oxygen-containing oxidant, for example air, is supplied to the cathode side of the fuel cell. The hydrogen molecules react at an anode catalyst present in the anode region according to the equation

and output electrons to the electrode while forming positively charged hydrogen ions.

The $H^+$-ions formed in the anode region subsequently diffuse through the electrolyte to the cathode where they react at a cathode catalyst, present in the cathode region and typically provided on a carbon carrier, with the oxygen supplied to the cathode and the electrons conducted via an outer circuit to the cathode according to the equation

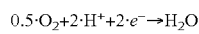

to form water. The operating temperature of the fuel cell depends on the type of electrolyte used in the fuel cell. For example the operating temperature of a conventional polymer electrolyte membrane fuel cell is approximately 60 to 80° C.

A particular advantage of the apparatus according to the invention for preparing meals consists in that the water produced as a reaction product during operation of the fuel cell may optimally be used for the preparation of meals in the meal preparation unit. The apparatus according to the invention for preparing meals can thus be operated in a particularly energy efficient manner. With use of the apparatus according to the invention for preparing meals on board an aircraft a water tank for storing water for the preparation of hot meals may be omitted. Since the fuel cell of the supply unit produces sufficient water, even dehydrated ready meals, which may be brought into the ready-to-serve state by the supply of sufficient water or steam from the fuel cell system of the supply unit, can be used without problems. Compared with conventional ready meals a considerable weight saving may be achieved by using dehydrated ready meals and the shelf-life of the meals can be significantly increased.

In principle it is possible to produce water or steam of drinking water quality in a fuel cell. The requirements for this are sufficient purity of the educts supplied to the fuel cell and an optimally microorganism-free and food-safe configuration of the relevant components of the fuel cell system that come into contact with the educts supplied to the fuel cell and the water and/or steam produced by the fuel cell. In the case of the apparatus according to the invention for preparing meals the relevant components of the supply unit are therefore preferably kept as clean, microorganism-free and food safe as possible. This ensures that the food preparation unit of the apparatus for preparing meals is always supplied with drinking water (vapour) of consistently high quality.

The meal preparation unit of the apparatus according to the invention for preparing meals comprises a plurality of receiving devices for receiving the meals that are to be prepared in the meal preparation unit. The receiving devices can for example be constructed in the form of a container or a slide-in compartment. The receiving devices can be relatively small in volume and be used for example to receive only one ready meal.

In the case of the apparatus according to the invention for preparing meals the meal preparation unit comprises a supplying mechanism which is used to supply the water produced by the fuel cell and/or the steam produced by the fuel cell to the meals that are to be prepared in the meal preparation unit. For example the supplying mechanism, which may be connected to the supply unit, can comprise one or more conduit(s) via which the water produced by the fuel cell and/or the steam produced by the fuel cell may be supplied to the receiving device(s).

Since the meal preparation unit of the apparatus according to the invention for preparing meals comprises a plurality of receiving devices, the supplying mechanism preferably also comprises a distributor for distributing the water and/or steam produced by the fuel cell among the various receiving devices. Corresponding valves may be arranged in the conduits connecting the distributor with the individual receiving devices, so that the distributor can supply water and/or steam to individual receiving devices while the supply of water and/or steam to other receiving devices is interrupted. The valves may also provide metering of the water and/or steam. The ready meals received in the receiving devices can then be subjected to the action of water and/or steam in a selective and metered manner.

Using the meal preparation unit of the apparatus according to the invention for preparing meals various types of meal may be brought into the ready-to-serve state simultaneously or in a delayed manner. For example different, optionally dehydrated, ready meals may be introduced into the receiving device or devices and be subjected therein to the action of water and/or steam from the fuel cell of the supply unit in a selective and metered manner.

The meal preparation unit also comprises a selecting mechanism via which a user can select the receiving device that is to be supplied by the distributor with water and/or steam and thus the meal that is to be brought into the ready-to-serve state. The meal selected by way of the selecting mechanism and then prepared in the meal preparation unit can then be dispensed to the user via a dispensing device, constructed for example in the form of a dispensing chute, of the meal preparation unit. With use of the apparatus according to the invention for preparing meals on board a commercial aircraft the passengers can consequently be supplied with different meals at any time and without great effort.

The supply unit is preferably also equipped to supply the meal preparation unit with energy generated by the fuel cell. In other words, with the apparatus according to the invention for preparing meals the energy generated by the fuel cell, i.e. the electrical energy generated during operation of the fuel cell and/or the thermal energy produced during operation of the fuel cell, can be supplied to the meal preparation unit and thus be used for preparing meals. For example electrical energy generated by the fuel cell can be used to drive electrical loads in the meal preparation unit, such as an electronic control unit, electrically actuated valves or an electrical heating system. Thermal energy generated by the fuel cell on the other hand can be used for example to directly heat or keep hot the meals that are to be prepared in the meal preparation unit.

The supply unit can be solely provided to supply water and/or steam, and, if required, energy too, to the food preparation unit of the apparatus according to the invention for preparing meals. As an alternative to this the supply unit may, however, also be part of a separate or higher-order energy and/or water supply system and in addition to the meal preparation unit of the apparatus according to the invention for preparing meals may also supply other systems, for example systems on board an aircraft, with water and/or steam produced by the fuel cell and/or energy generated by the fuel cell.

The meal preparation unit of the apparatus according to the invention for preparing meals can comprise a storage container for receiving the water and/or steam produced by the fuel cell of the supply unit. The storage container can for example be connected to the supplying mechanism of the meal preparation unit to supply the supplying mechanism with the water and/or steam required for meal preparation. The storage container may be heated as required, wherein the electrical energy generated by the fuel cell of the supply unit may be used for this purpose or else the thermal energy generated by the fuel cell may be used directly. As an alternative or in addition to this the storage container may also be provided with appropriate insulation which, optionally even without additional heating, is capable of keeping the water removed from the fuel cell of the supply unit and/or steam removed from the fuel cell of the supply unit at the temperature required for meal preparation.

In the meal preparation unit of the apparatus according to the invention for preparing meals there is preferably provided an energy store for storing the energy generated by the fuel cell of the supply unit. The energy store, for example in the form of a rechargeable battery, can preferably be electrically connected to the fuel cell of the supply unit, so, if required, it may be recharged by the electrical energy generated by the fuel cell. By providing an energy store in the meal preparation unit electrical loads of the meal preparation unit, such as an electronic control unit, electrically actuated valves or an electrical heating system, may be operated independently of the supply unit at least for a certain time.

The fuel cell used in the supply unit of the apparatus according to the invention for preparing meals is preferably a polymer electrolyte membrane fuel cell, wherein in a particularly preferred embodiment of the apparatus according to the invention for preparing meals a high-temperature polymer electrolyte membrane fuel cell is used. In principle polymer electrolyte membrane fuel cells have the advantage that they are relatively simple to produce since the membrane films used as the electrolyte are relatively insensitive and are easy to handle. During operation of the fuel cell the electrolyte is not consumed either and therefore does not have to be replaced or processed during the service life of the cell. Moreover polymer electrolyte membrane fuel cells have a relatively long life. Finally polymer electrolyte membrane fuel cells can be started and stopped relatively simply and quickly.

High-temperature polymer electrolyte membrane fuel cells differ from conventional polymer electrolyte membrane fuel cells in the type of electrolyte membrane used in the fuel cell, which, depending on the composition, allows elevated operating temperatures, compared with conventional polymer electrolyte membrane fuel cells, of approximately 120° C. to 300° C. In the case of the apparatus according to the invention for preparing meals the use of a high-temperature polymer electrolyte membrane fuel is cell has the advantage that degermination of the water produced during the fuel cell reaction is already taking place in the cell at the elevated operating temperature thereof. High steam temperatures when preparing dehydrated ready meals by the action of steam are also advantageous.

In a preferred embodiment of the apparatus according to the invention for preparing meals the fuel cell system of the supply unit comprises a hydrogen tank connected to an anode region of the fuel cell. The hydrogen tank is ideally capable of receiving liquid hydrogen and can for example comprise an inner vessel, with a steel or aluminium wall, which is surrounded by one or more heat-insulating layer(s). The inner vessel of the liquid hydrogen tank can be arranged in an outer housing made of steel or aluminium, wherein the space between the inner vessel and the outer housing may be filled with materials that are poor conductors of heat.

The storage temperature of liquid hydrogen is approximately −253° C., and this has the advantage, in particular when using liquid hydrogen as a fuel for a fuel cell system on board an aircraft, that the hydrogen tank may be housed in the unheated loading region of the aircraft, outside of the cabin without there being the problem of the fuel freezing. Liquid hydrogen with a very high degree of purity may also be obtained and this has a positive effect on the quality of the water and/or steam produced by the reaction of the hydrogen in the fuel cell.

As an alternative to this the hydrogen tank may also be a pressure accumulator capable of storing hydrogen under elevated pressure and, for example, comprise an inner container covered with carbon fibres and made of aluminium, and an outer casing made of plastics material.

As a further alternative the fuel cell system of the supply unit in the apparatus according to the invention for preparing meals can also comprise a device connected to the anode region of the fuel cell for producing hydrogen from a hydrogen-containing medium. For example a reforming unit for producing hydrogen from hydrocarbons, such as methanol, may be provided.

The fuel cell system of the supply unit preferably also comprises a device connected to a cathode region of the fuel cell and which is used to supply an oxygen-containing medium to the cathode region of the fuel cell. This device may, for example, comprise an oxygen supply conduit connected to the cathode region of the fuel cell and a compressor arranged in the oxygen supply conduit or a pump arranged in the oxygen supply conduit. The oxygen-containing medium supplied to the cathode region of the fuel cell is preferably air, which can be drawn in by means of the compressor or the pump, for example from the cabin of the aircraft. As an alternative to this air may also be supplied to the cathode region of the fuel cell directly from the air conditioning system of the aircraft, however. Finally it is also conceivable to supply pure oxygen, contained in an appropriate store, to the cathode region of the fuel cell.

In a preferred embodiment of the apparatus according to the invention for preparing meals the supply unit comprises a steam preparer for processing water and/or steam issuing from the fuel cell. The steam preparer ensures that the water/steam mixture issuing from the fuel cell, which mixture can have different compositions, be at different temperatures and pressures depending on the operating temperature of the fuel cell, is brought to the temperatures and pressures required for preparation of meals by the action of water and/or steam. The steam preparer is preferably supplied with energy generated by the fuel cell of the supply unit, i.e. with electrical energy generated by the fuel cell and/or with thermal energy generated by the fuel cell. The steam preparer may for example also be is controlled by means of an electronic control unit in order to be able to optionally adjust the steam preparation process to different requirements during preparation of different types of meal. The steam preparer preferably also comprises a collecting region which has an appropriately large volume to be able to temporarily store a certain amount of steam if required.

The steam preparer can preferably be connected to the storage container of the meal preparation unit, so, if required the storage container can be filled with the steam produced by the steam preparer or the steam temporarily stored in the collecting region of the steam preparer. If the meal preparation unit does not have a storage tank the steam preparer may also be directly connected to the supplying mechanism or the receiving device of the meal preparation unit.

As already mentioned it is basically possible to produce water and/or steam of drinking water quality by way of a fuel cell reaction, if the educts supplied to the fuel cell are sufficiently pure and the components of the fuel cell system and the steam preparer are sufficiently clean, microorganism-free and food safe. To ensure that the water/steam supplied to the meal preparation unit of the apparatus according to the invention for preparing meals is of sufficiently high quality a device for measuring the quality of the water and/or steam produced by the fuel cell may be provided in the supply unit. This device, which for example can be connected downstream of the steam preparer or can be integrated therein, is preferably capable of testing the water/steam produced by the fuel cell with respect to various chosen ingredients.

If required the supply unit of the apparatus according to the invention for preparing meals may also comprise a water (vapour) purification device which, for example, by the addition or separation of specific components to or from the water and/or steam produced by the fuel cell ensures that the water/steam supplied to the meal preparation unit is of drinking water quality. The water (vapour) purification device can for example be integrated in the steam preparer or be constructed separately therefrom.

The supply unit of the apparatus according to the invention for preparing meals preferably also comprises a heat management arrangement which is used to control the operating temperature of the fuel cell and/or the operating temperature of the steam preparers and thus the temperature of the steam produced by the steam preparer. For example the heat management arrangement can comprise a cooling system for cooling the fuel cell during operation, wherein the heat lost from the fuel cell can be recovered, for example by providing heat exchangers in the cooling system, and be used to heat the steam preparer. It is also conceivable to supply the heat lost from the fuel cell to the meal preparation unit and to use it therein to directly heat the steam storage container or the receiving device, for example to keep meals in the receiving device hot. Excess heat generated during operation of the fuel cell and which cannot be supplied by the heat management arrangement to a further use, can be dissipated to the environment by an external cooler.

In one embodiment of the apparatus according to the invention for preparing meals the meal preparation unit and the supply unit are constructed as separate components which however, if required, can be joined together and separated from each other. For example the meal preparation unit can be constructed as a mobile component, for example in the form of a trolley, while the supply unit can be provided in the form of a stationary base or docking station.

A system according to the invention of apparatuses for preparing meals comprises a plurality of optionally mobile meal preparation units which may each be configured as described above, i.e. can comprise a plurality of receiving devices as well as a supplying mechanism and a storage container and/or energy store. The system according to the invention of apparatuses for preparing meals also comprises at least one supply unit that may be connected to the meal preparation units, wherein it is obviously also conceivable for the system according to the invention of apparatuses for preparing meals to be equipped with a plurality of supply units that are arranged so as to be distributed at various points, for example in an aircraft passenger cabin. Each supply unit of the system according to the invention of apparatuses for preparing meals comprises a fuel cell system having a fuel cell, wherein the fuel cell is connected to the supplying mechanisms of the meal preparation units to supply the supplying mechanisms with water produced by the fuel cell. Each supply unit of the system according to the invention of apparatuses for preparing meals may also be configured as described above in connection with the apparatus according to the invention for preparing meals, i.e. for example also be equipped to supply the plurality of meal preparation units with energy generated by the fuel cell or comprise a polymer electrolyte membrane fuel cell, in particular a high-temperature polymer electrolyte membrane fuel cell, a steam preparer, a device for measuring the water quality, a water (vapor) processing device and/or a heat management arrangement.

If the system according to the invention of apparatuses for preparing meals comprises a plurality of supply units, each supply unit, as described above, may be equipped with a fuel cell system. As an alternative to this it is however also possible to provide a central fuel cell system and to connect it to a plurality of supply units. It is also possible to associate a separate fuel cell with a plurality of supply units but to supply these separate fuel cells with hydrogen and/or an oxygen-containing medium by way of a common hydrogen tank or a common device for producing hydrogen from a hydrogen-containing medium and/or by way of a commonly used device for supplying an oxygen-containing medium.

BRIEF DESCRIPTION OF THE DRAWING

A preferred embodiment of the invention will now be described in more detail with reference to the single accompanying FIGURE which shows a schematic diagram of an apparatus according to the invention for preparing meals.

DETAILED DESCRIPTION

In the FIGURE an apparatus 10 for preparing meals comprises a meal preparation unit 12 and a supply unit 14. In the illustrated embodiment the meal preparation unit 12 and the supply unit 14 are each constructed as stationary components which, for example, may be housed in the galley of a commercial aircraft. As an alternative to this it is however also conceivable to configure the meal preparation unit 12 as a mobile unit, for example in the form of a trolley, and the supply unit 14 in the form or a stationary base or docking station. The meal preparation unit 12 is provided with fluid conduit connections and electrical connections which are connected to corresponding connections provided on the supply unit 14.

The supply unit 14 comprises a fuel cell system 16 with a high-temperature polymer electrolyte membrane fuel cell 18. Although the FIGURE only shows a single fuel cell 18 the fuel cell system 16 comprises a plurality of high-temperature polymer electrolyte membrane fuel cells 18 which are stacked one above the other for form what is known as a fuel cell stack.

The fuel cell 18 comprises an anode region 20 which is separated from a cathode region 24 by an electrolyte 22 constructed in the form of proton-conducting polymer film that is temperature stable up to 300° C. The anode region 20 of the fuel cell 18 is connected to a liquid hydrogen tank 26 which is filled with highly pure liquid hydrogen. Air is supplied to the cathode region 24 of the fuel cell 18 by means of a compressor 28 and is removed from the passenger cabin or the aircraft's air conditioning system in the case of use of the apparatus 10 for preparing meals on board a passenger aircraft.

The educts hydrogen and atmospheric oxygen supplied to the fuel cell 18 are reacted during operation of the fuel cell 18 by the generation of electrical energy, which is removed from the fuel cell 18 via lines 30, 32, to form water, wherein the water, at the operating temperature of the high-temperature polymer electrolyte membrane fuel cell 18 of approximately 300° C. exists in the form of steam, or owing to condensation processes in the fuel cell 18 or in conduits connected to the fuel cell 18, in the form of a water/steam mixture.

The composition, pressure and the temperature of the water/steam mixture issuing from the fuel cell 18 can vary depending on the operating temperature of the fuel cell 18. The supply unit 14 therefore comprises a steam preparer 34 for processing the water/steam mixture issuing from the fuel cell 18. The steam preparer 34 ensures that the water/steam mixture issuing from the fuel cell 18 is brought to the temperatures and pressures required for the preparation of meals by the action of water and/or steam, wherein the steam preparer 34 can be controlled by means of an electronic control unit (not shown in the FIGURE) in order to be able to adjust the steam preparation process to different requirements when preparing different types of meal in the meal preparation unit. The steam preparer 34 to and the electronic control unit associated therewith are supplied via the line 30 with electrical energy generated by the fuel cell 18 of the supply unit 14.

A heat management arrangement 36 is used to control the operating temperatures of the fuel cell 18 and the steam preparer 34 and comprises corresponding cooling systems and one or more heat exchanger(s). The heat given off by the fuel cell 18 during operation is supplied via a conduit 38 to the steam preparer 34. Excess waste heat from the fuel cell 18, which is not required for heating of the steam preparer 34, is dissipated to the environment via an external cooler 40.

The meal preparation unit 12 comprises a distributor 42 which is connected to the steam preparer 34 of the supply unit 14 via a conduit 44, so steam brought to the temperatures and pressures required for preparing meals by the action of water and/or steam can be supplied to the distributor 42 by the steam preparer 34.

The distributor 42 is connected to a plurality of receiving devices 45 for receiving the meals that are to be prepared in the meal preparation unit 12, wherein valves 47, which allow the individual receiving devices 45 to be selectively supplied with steam from the distributor 42, are arranged in the conduits 46 connecting the distributor 42 with the individual receiving devices 45. The valves 47 also allow respective metering of the steam to be supplied to the corresponding receiving device 45. Each receiving device 45 is constructed in the form of a container and is used to receive an optionally dehydrated ready meal.

The meal preparation unit 12 also comprises a selecting mechanism 48 for selecting a meal received in a respective receiving device 45. A dispensing device 50 is used for dispensing the selected meal. Finally the meal preparation unit 12 comprises a rechargeable battery 52, connected to the line 32 of the supply unit 14, and an electronic control unit 54 supplied with electrical energy by the battery 52. The electronic control unit 54 is used to control operation of the distributor 42 or the valves 47 to allow selective and metered loading of individual receiving devices 45 with steam and/or water.

The mode of operation of the apparatus 10 for preparing meals will be described hereinafter. During operation of the apparatus 10 for preparing meals passengers or flight attendants on board an aircraft may select the desired meal received in a corresponding receiving device 45 by way of the selecting mechanism 48. The distributor 42 and the valve 47 associated with the selected receiving device 45 is then activated by the electronic control unit 54, so the desired meal is prepared by the meal preparation unit 12 by the action of water and/or steam and is dispensed to the passenger or flight attendant by way of the dispensing device 50. It is understood that a plurality of or all meals received in the individual receiving devices 45 may also be selected by way of the selecting mechanism 48 and then be prepared simultaneously.

The electrical energy generated by the fuel cell 18 of the supply unit 14 is supplied via lines 30, 32 to the steam preparer 34 and the meal preparation unit 12, wherein the electrical energy supplied to the meal preparation unit 12 is used for recharging the battery 52. The steam produced by the fuel cell 18 and brought in the steam preparer 34 to the temperatures and pressures required for preparing meals by the action of water and/or steam is conveyed via the conduit 44 into the distributor 42 and from there via the valves 47 into the receiving devices 45 as required.

The invention claimed is:

1. Apparatus (10) for preparing meals, comprising:
   a meal preparation unit (12) which includes:
   a plurality of receiving devices (45) for receiving the meals that are to be prepared in the meal preparation unit (12),
   a selecting mechanism (48) for selecting a meal that is to be prepared and is received in a receiving device (45), and
   a supplying mechanism (42, 46, 47) which selectively supplies steam to a meal that is to be prepared and has been selected by way of the selecting mechanism (48), and
   a supply unit (14) which includes:
   a fuel cell system (16) having a fuel cell (18), the fuel cell (18) connected to the supplying mechanism (42, 46, 47) of the meal preparation unit (12) to supply the supplying mechanism (42, 46, 47) with steam produced by the fuel cell (18),
   a steam preparer (34) for processing steam issuing from the fuel cell (18), and
   a heat management arrangement (36) adapted to control the operating temperature of the fuel cell (18) and the operating temperature of the steam preparer (34), the heat management arrangement (36) cooling the fuel cell (18) during operation and heating the steam preparer (34) using waste heat generated by the fuel cell (18).

2. Apparatus for preparing meals according to claim 1, wherein the supply unit (14) supplies the meal preparation unit (12) with energy generated by the fuel cell (18).

3. Apparatus for preparing meals according to claim 1, wherein the meal preparation unit (12) comprises a dispensing device (50) for dispensing the meals prepared in the meal preparation unit (12).

4. Apparatus for preparing meals according to claim 1, wherein the meal preparation unit (12) comprises an energy store (52) for storing the energy generated by the fuel cell (18).

5. Apparatus for preparing meals according to claim 1, wherein the fuel cell (18) is a polymer electrolyte membrane fuel cell, in particular a high-temperature polymer electrolyte membrane fuel cell.

6. Apparatus for preparing meals according to claim 1, wherein the fuel cell system (16) comprises a hydrogen tank (26) connected to an anode side (20) of the fuel cell (18).

7. Apparatus for preparing meals according to claim 1, wherein the fuel cell system (16) comprises a device (28) connected to a cathode side (24) of the fuel cell (18) for supplying an oxygen-containing medium to the cathode side (24) of the fuel cell (18).

8. Apparatus for preparing meals according to claim 1, wherein the fuel cell system (16) comprises a device, connected to an anode side (20) of the fuel cell (18) for producing hydrogen from a hydrogen-containing medium.

9. Apparatus for preparing meals according to claim 1, wherein the supply unit (14) is a stationary supply unit (14) configured to be coupled with a plurality of mobile meal preparation units (12).

* * * * *